(12) United States Patent
Matsunaga et al.

(10) Patent No.: US 9,756,562 B2
(45) Date of Patent: Sep. 5, 2017

(54) WIRELESS TRANSMISSION DEVICE, WIRELESS RECEPTION DEVICE, WIRELESS TRANSMISSION PROGRAM, WIRELESS RECEPTION PROGRAM, AND WIRELESS COMMUNICATION SYSTEM

(71) Applicant: Oki Electric Industry Co., Ltd., Tokyo (JP)

(72) Inventors: Toshihiko Matsunaga, Osaka (JP); Yasutaka Kawamoto, Tokyo (JP); Yuki Kubo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 155 days.

(21) Appl. No.: 14/739,714

(22) Filed: Jun. 15, 2015

(65) Prior Publication Data

US 2016/0021612 A1    Jan. 21, 2016

(30) Foreign Application Priority Data

Jul. 16, 2014    (JP) ................................. 2014-146167

(51) Int. Cl.
| | |
|---|---|
| *H04L 1/00* | (2006.01) |
| *H04W 52/02* | (2009.01) |
| *H04W 56/00* | (2009.01) |
| *H04L 12/12* | (2006.01) |
| *H04W 74/08* | (2009.01) |

(52) U.S. Cl.
CPC ......... *H04W 52/0209* (2013.01); *H04L 12/12* (2013.01); *H04W 56/00* (2013.01); *H04W 74/0816* (2013.01); *Y02B 60/50* (2013.01)

(58) Field of Classification Search
CPC .................. H04B 7/00; H04L 12/5601; H04L 2012/5603; H04L 2012/5604; H04L 2012/5607; H04L 2012/5608; H04L 12/18; H04L 12/184; H04L 12/1845; H04L 12/185; H04L 2012/5642; H04L 2012/64; H04Q 2213/1329; H04Q 2213/29; H04J 2203/0019
USPC .................................. 370/310, 311, 312, 313
See application file for complete search history.

(56) References Cited

U.S. PATENT DOCUMENTS

2013/0259016 A1\* 10/2013 Xhafa ................... H04W 84/18
                                                                370/338
2015/0236947 A1\* 8/2015 Kobayashi .............. H04L 45/20
                                                                370/254

OTHER PUBLICATIONS

Robert F. Heile et al., "Part 15.4: Low-Rate Wireless Personal Area Networks (LR-WPANS)", Feb. 2012.

(Continued)

*Primary Examiner* — Dady Chery
(74) *Attorney, Agent, or Firm* — Rabin & Berdo, P.C.

(57) ABSTRACT

There is provided a wireless transmission device in which a lower layer processing unit inserts first random delay before frame transmission in response to a frame transmission request made by an upper layer processing unit, the wireless transmission device including a frame transmitting unit configured to transmit a frame when the frame transmission request is made by the upper layer processing unit, and a frame group transmitting unit configured to transmit a frame group including one or two or more types of frame in accordance with a listening state of a facing wireless reception device when the frame transmission request is made by the upper layer processing unit.

6 Claims, 13 Drawing Sheets

(56) References Cited

OTHER PUBLICATIONS

Robert F. Heile et al., "Part 15.4: Low-Rate Wireless Personal Area Networks (LR-WPANS)", Jun. 11.

* cited by examiner

US 9,756,562 B2

WIRELESS TRANSMISSION DEVICE, WIRELESS RECEPTION DEVICE, WIRELESS TRANSMISSION PROGRAM, WIRELESS RECEPTION PROGRAM, AND WIRELESS COMMUNICATION SYSTEM

CROSS REFERENCE TO RELATED APPLICATION(S)

This application is based upon and claims benefit of priority from Japanese Patent Application No. 2014-146167, filed on Jul. 16, 2014, the entire contents of which are incorporated herein by reference.

BACKGROUND

The present invention relates to a wireless transmission device, a wireless reception device, a wireless transmission program, a wireless reception program, and a wireless communication system. The present invention may be applied, for example, to a wireless communication device for intermittent reception.

For example, a communication device (which will also be referred to as "transmission device" or "reception device" below) included in a sensor network is configured to perform power-saving communication. Typical methods for power-saving communication include intermittently operating communication devices. For example, coordinated sampled listening (CSL) is a communication standard that adopts this intermittent operating method for communication devices (see IEEE802.15.4e).

A CSL sampled listening period (CSLPeriod), a maximum CSL sampled listening period (CSLMaxPeriod), active time (wakeup reception time) in which wakeup frames can be intermittently received, and the like are set for each of communication devices that adopt the CSL.

First of all, a transmission device S that attempts to transmit data executes an operation of transmitting data in an asynchronous transmission mode. The following is the asynchronous transmission mode. The transmission device S successively transmits wakeup frames to a reception device R in the maximum CSL sampled listening period. Rendezvous time (RZTime) is written in the wakeup frame, the rendezvous time (RZTime) indicating the remaining time from data transmission. Once the transmission device S finishes transmitting wakeup frames in one maximum CSL sampled listening period, the transmission device S subsequently transmits a data frame to the reception device R.

The reception device R stays in a listening state only for the active time within the one CSL sampled listening period, and does not perform any reception operation for the other time. Once the reception device R receives a wakeup frame from the transmission device S in the listening state, the reception device R acquires the rendezvous time in the frame. The reception device R is activated (listening state) after sleeping until just before the rendezvous time, and receives a data frame from the transmission device S.

The reception device R replies a reception response signal (ACK) to the transmission device S upon receiving a data frame. Inserted into the ACK are a listening period, and a phase (CSLPhase) indicating a gap between the time of synchronization information in the wakeup frame and the reception time.

If the transmission device S receives no ACK from the reception device R, the transmission device S transmits a wakeup frame and a data frame to the reception device R in the asynchronous transmission mode again in transmitting the next data frame.

If the transmission device S receives an ACK from the reception device R, the transmission device S enters a synchronous transmission mode. The transmission device S retains a phase and corrects synchronization with the reception device R in the listening period in the ACK. The transmission device S then transmits a wakeup frame and a data frame at the corrected transmission timing in transmitting the next data frame. Wakeup frame transmission time (or the number of transmission) in the synchronous transmission mode may only be time for which synchronization can be corrected. Compared with the asynchronous transmission mode, this transmission time (or the number of transmission) can be remarkably reduced to from 10% to 1%.

If a transmission device other than the transmission device S performs wireless transmission, the transmission interferes with the transmission of the transmission device S and the reception device R becomes unable to receive a wakeup frame. Methods for avoiding such a collision include carrier sense multiple access with collision avoidance (CSMA/CA).

For example, the CSMA/CA described in IEEE802.15.4 is the following algorithm. FIG. 11 is a flowchart illustrating the CSMA/CA algorithm.

The transmission device S sets, for example, at 5 in advance, the minimum value (macMinBE) of a backoff exponent (which will also be referred to as "BE" below) in control information related to communication control which is referred to as personal area network information base (which will also be referred to as "PIB" below). The backoff exponent (BE) is a parameter used for a function random discussed below.

In addition, the transmission device S sets the maximum number of backoff (macMaxCSMABackoff), for example, at 4 in advance. The NB is a counter that will be discussed below and counts the number of CCA failure. Meanwhile, the random is a function that outputs a random value for an input value.

If there is a frame transmission request, the transmission device S sets 0 for the NB and sets the value of the macMinBE for the BE in the first place (S001).

The transmission device S gives as much delay as time obtained by multiplying a unit backoff period by an output result of a random ($2^{BE}-1$) (S002).

The transmission device S performs clear channel assessment (which will also be referred to as "CCA" below) and examines whether or not a corresponding CH is in use (S003).

If the corresponding CH is idle or no wireless carrier is sensed, the transmission device S can transmit a frame as a success (S004).

If the transmission device S senses a wireless carrier, the transmission device S increases the NB by one. Meanwhile, the transmission device S also increases the BE by one (S005).

If the NB exceeds the maximum number of backoff, the transmission device S, as failure, does not perform transmission (S006).

If the NB does not exceed the maximum number of backoff, the transmission device S returns to the process in step S002 again and executes the processes in the following steps. The value of the BE increases if the transmission device S senses a wireless carrier. Accordingly, there is a high probability that a delay amount in one period increases.

There may only be time for which the reception device R can receive any of transmitted wakeup frames as active time for which the reception device R performs wakeup reception. Shorter active time brings about more power-saving effects, but too short active time results in difficulty in receiving a wakeup frame.

FIG. 12 is an explanatory diagram illustrating that a plurality of transmission devices make transmission requests at the same time.

A transmission device S1 transmits data to the reception device R in a CSL mode. A transmission device S2 transmits data to a communication device other than the transmission device S1 and the reception device R in a normal mode (a communication mode other than the CSL mode is referred to as "normal mode").

Let us assume that the transmission device S1 attempts to transmit a wakeup frame 21 and the transmission device S2 attempts to transmit a data frame 11 at time t11.

Since delay time caused by backoff, which is computed in the process of step S002 discussed above, is multiplied by a random value, it is not know which of the transmission device S1 and the transmission device S2 has longer delay time. If the transmission device S2 has shorter delay time caused by backoff, the transmission device S1 performs wireless carrier sensing on the transmission of the transmission device S2 while the transmission device S1 is performing CCA. Consequently, after the transmission device S2 completes transmitting the data frame 11, the transmission device S1 transmits the wakeup frame 21.

If the transmission timing of a wakeup frame 22 from the transmission device S1 is delayed, the reception device R fails to receive the wakeup frame 22 for active time 33.

In this way, even if the reception device R is correctly synchronized with the transmission device S1, the CSMA/CA causes transmission delay of a wakeup frame or causes transmission intervals to be longer and the reception device R fails to receive the wakeup frame within the active time in some cases. If the reception device R does not receive any wakeup frame, the reception device R does not reach the listening state in receiving data. Consequently, a reception error occurs with respect to a data frame.

SUMMARY

As discussed above, a reception error is caused by a gap between the wakeup reception time of a reception device and the transmission timing of a wakeup frame by a transmission device.

Longer wakeup reception time allows a reception device to receive a wakeup frame on the basis of transmission delay of a wakeup frame and a fluctuation in transmission intervals, which, however, results in longer active time and unfortunately makes it difficult to save power.

If a reception device fails to perform synchronous communication, the reception device enters an asynchronous communication mode. Wakeup frames are transmitted much more frequently and the transmission of wakeup frames occupies a network much longer during the asynchronous communication than during the synchronous communication, imposing a heavier load on a network.

It is thus desired to provide a wireless transmission device, a wireless reception device, a wireless transmission program, a wireless reception program, and a wireless communication system that can efficiently perform synchronous communication while saving power.

According to a first embodiment of the present invention, there is provided a wireless transmission device in which a lower layer processing unit inserts first random delay before frame transmission in response to a frame transmission request made by an upper layer processing unit, the wireless transmission device including (1) a frame transmitting unit configured to transmit a frame when the frame transmission request is made by the upper layer processing unit, and (2) a frame group transmitting unit configured to transmit a frame group including one or two or more types of frame in accordance with a listening state of a facing wireless reception device when the frame transmission request is made by the upper layer processing unit. (3) Second random delay to be inserted before frame transmission of a second or following frame in the frame group before the frame group transmitting unit transmits the frame group is different from the first random delay to be inserted before the frame transmitting unit transmits a frame.

According to a second embodiment of the present invention, there is provided a wireless reception device that changes from a sleep state to a listening state only for active time which intermittently occurs in each listening period, receives a frame group including one or two or more types of frame, and replies a reception response frame upon receiving a predetermined frame, the wireless reception device including a frame group reception estimating unit configured to measure reception signal strength successively for a predetermined period, and to determine that a frame group is being transmitted around the wireless reception device, when the reception signal strength is greater than or equal to a predetermined value.

According to a third embodiment of the present invention, there is provided a wireless transmission program causing a computer mounted on a wireless transmission device in which a lower layer processing unit inserts first random delay before frame transmission in response to a frame transmission request made by an upper layer processing unit to function as (1) a frame transmitting unit configured to transmit a frame when the frame transmission request is made by the upper layer processing unit, and (2) a frame group transmitting unit configured to transmit a frame group including one or two or more types of frame in accordance with a listening state of a facing wireless reception device when the frame transmission request is made by the upper layer processing unit. (3) Second random delay to be inserted before frame transmission of a second or following frame in the frame group before the frame group transmitting unit transmits the frame group is different from the first random delay to be inserted before the frame transmitting unit transmits a frame.

According to a fourth embodiment of the present invention, there is provided a wireless reception program causing a computer mounted on a wireless reception device that changes from a sleep state to a listening state only for active time which intermittently occurs in each listening period, receives a frame group including one or two or more types of frame, and replies a reception response frame upon receiving a predetermined frame to function as a frame group reception estimating unit configured to measure reception signal strength successively for a predetermined period, and to determine that a frame group is being transmitted around the wireless reception device, when the reception signal strength is greater than or equal to a predetermined value.

According to a fifth embodiment of the present invention, there is provided a wireless communication system including one or two or more wireless transmission devices, and one or two or more wireless reception devices. (1) Each of the wireless transmission devices is the wireless transmission device according to the first embodiment of the present invention. (2) Each of the wireless reception devices is the wireless reception device according to the second embodiment of the present invention.

Adjusting delay before frame transmission in a method for transmitting a frame allows power to be saved and allows synchronous communication to be efficiently performed.

DETAILED DESCRIPTION OF THE EMBODIMENT(S)

Figure 1:
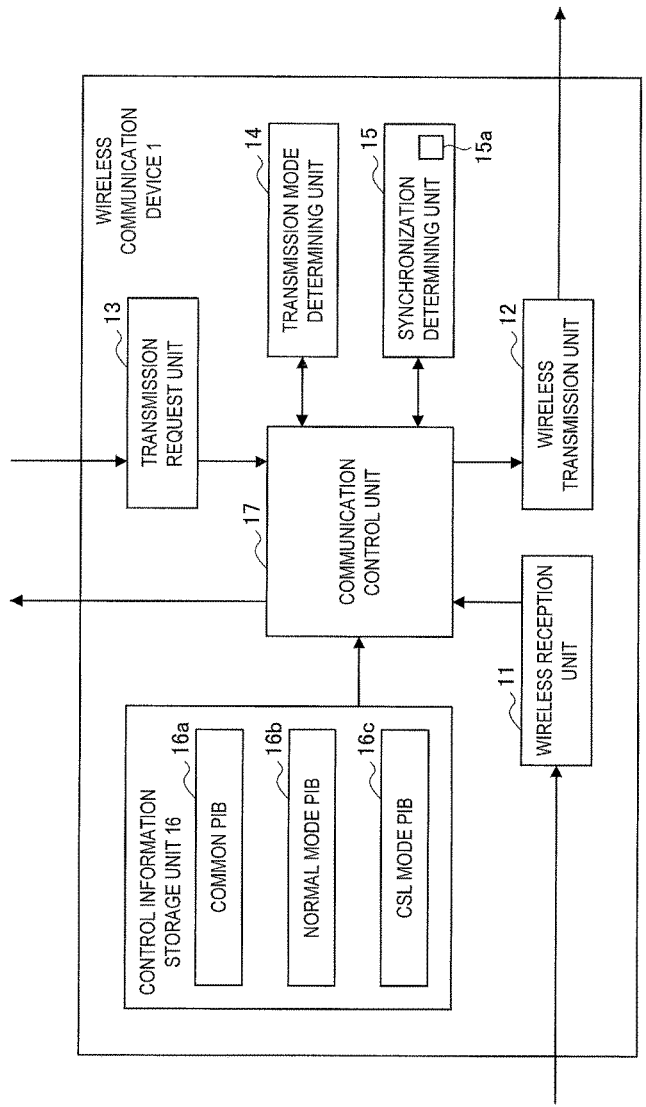
FIG. 1 is a block diagram illustrating a configuration of a wireless communication device according to a first embodiment.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) First Embodiment

A wireless transmission device, a wireless reception device, a wireless transmission program, a wireless reception program, and a wireless communication system according to a first embodiment of the present invention will be described below in detail with reference to the appended drawings.

(A-1) Configuration According to First Embodiment

FIG. 1 is a block diagram illustrating the configuration of the wireless communication device according to the first embodiment, which serves as a wireless transmission device or a wireless reception device.

FIG. 1 illustrates that a wireless communication device 1 includes a wireless reception unit 11, a wireless transmission unit 12, a transmission request unit 13, a transmission mode determining unit 14, a synchronization determining unit 15, a control information storage unit 16, and a communication control unit 17.

The wireless communication device according to the first embodiment can also have units other than the wireless reception unit and the wireless transmission unit formed of hardware. In addition, the units can also be implemented by software (wireless transmission program and wireless reception program) to be executed by a CPU in combination with the CPU. Whichever implementation method is adopted, the function can be illustrated in FIG. 1.

The wireless reception unit 11 has a function of converting a wireless signal into an electrical signal, and inputting a reception signal to the transmission control unit 17. The wireless transmission unit 12 has a function of converting a transmission signal into a wireless signal, and transmitting the wireless signal. The transmission request unit 13 has a function of accepting a data transmission request, and relaying the data transmission request to the communication control unit 17.

The transmission mode determining unit 14 has a function of deciding which of a CSL mode and a normal mode is used to perform transmission to a wireless communication device that is a transmission destination. A variety of methods can be used as the determination method. For example, the transmission mode determining unit 14 can decide the CSL mode or the normal mode for each of transmission destination addresses.

The synchronization determining unit 15 stores synchronization information in a synchronization information storage section 15a. If a transmission destination is decided and synchronous communication is established, the synchronization determining unit 15 writes the transmission destination address, a phase difference, information on the last transmission time and the like in the synchronization information storage section 15a, and updates the content upon each reception of an ACK. Once a transmission destination address is input to the synchronization determining unit 15, the synchronization determining unit 15 searches the synchronization information storage section 15a for the transmission destination address. If the transmission destination address matches, the synchronization determining unit 15 replies synchronization information.

The control information storage unit 16 includes a common PIB 16a, a normal mode PIB 16b, and a CSL mode PIB 16c as its structural elements. The common PIB 16a stores information on common communication control irrespective of the communication modes. The normal mode PIB 16b stores information on communication control related to the normal mode. For example, the initial value macMinBEnormal of backoff time for the normal mode is stored. The CSL mode PIB 16c stores information on communication control related to the CSL mode. For example, the initial value macMinBEcs1 of backoff time for the CSL mode is stored.

Conventionally, the macMinBEnormal and the macMinBEcs1 were not distinguished for each communication mode, and the common PIB 16a stored them as the initial value of the common backoff time.

If there is a transmission request, the communication control unit 17 use information stored in the control information storage unit 16 and carrier sensing information from the wireless reception unit 11 for performing communication control to generate a transmission frame and decide transmission timing. Meanwhile, if the CSL mode is used, the communication control unit 17 also uses a determination result in the control information storage unit 16 and the synchronization determining unit 15 for performing communication control.

(A-2) Operation According to First Embodiment

Figure 2:
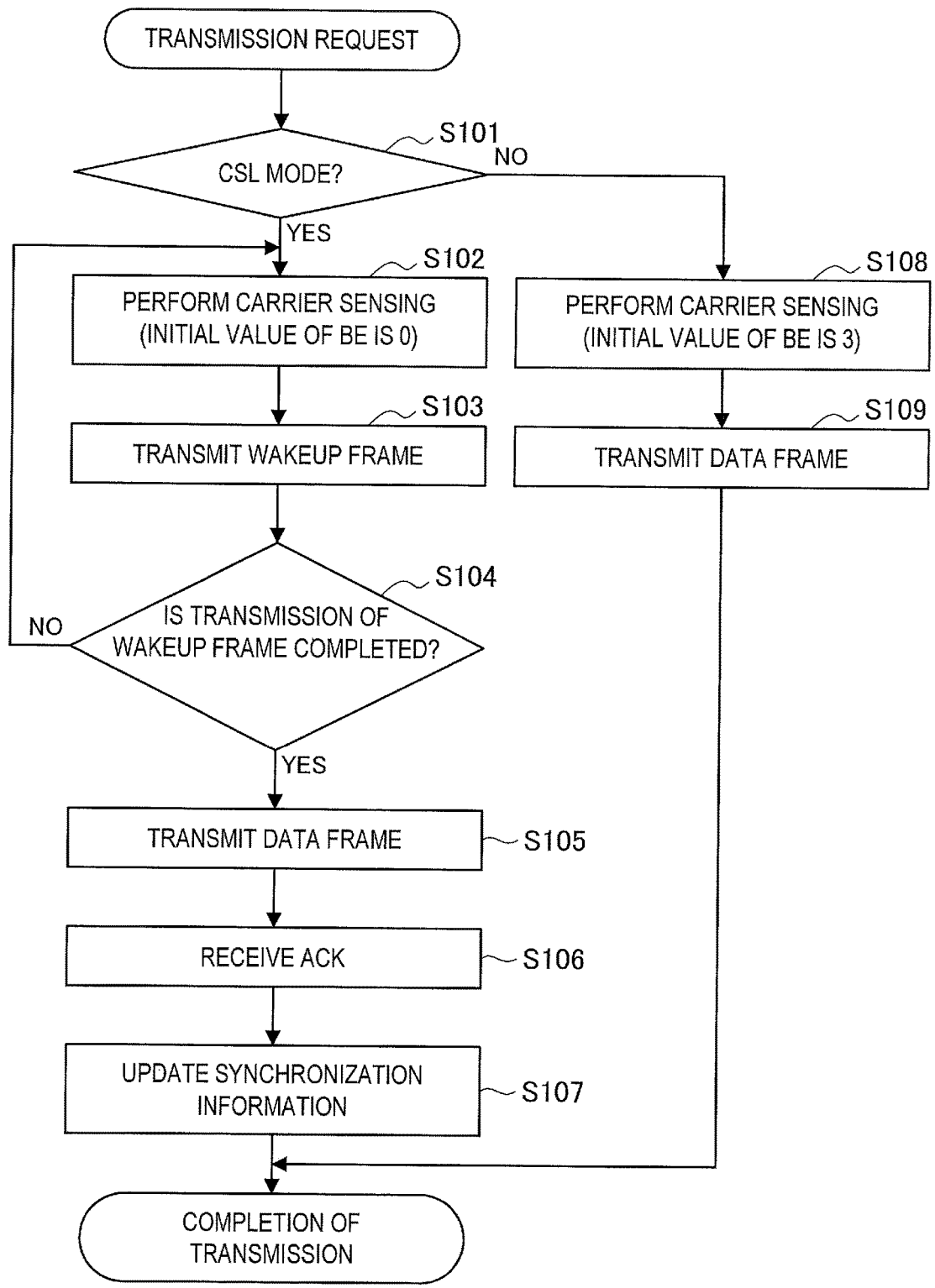
FIG. 2 is a flowchart illustrating an operation of a wireless communication device (transmission side) according to the first embodiment.

FIG. 2 is a flowchart illustrating an operation of a wireless communication device (transmission side) according to the first embodiment.

The macMinBEnormal (for the normal mode) is set at a default value 3 as the initial value of backoff time in the first embodiment, while the macMinBEcs1 (for the CSL mode) is set at 0, which is the minimum value within a settable range. Any other value may also be set, but the value of the macMinBEcs1 has to be set below the value of the macMinBEnormal. In other words, backoff time is set so as to be as short as possible in the CSL mode.

If there is a transmission request from the transmission request unit 13, the communication control unit 17 inputs a transmission destination and the type of data to the transmission mode determining unit 14 in the first place. The communication control unit 17 determines which of the normal mode and the CSL mode is used to perform transmission, on the basis of an output result from the transmission mode determining unit 14 (S101).

The communication control unit 17 executes the process in step S102 discussed below if the CSL mode is used, while the communication control unit 17 executes the process in step S108 discussed below if the normal mode is used.

If there is a transmission request in the CSL mode, the communication control unit 17 performs carrier sensing in the following procedure before transmitting a wakeup frame (S102).

First of all, the communication control unit 17 inputs a transmission destination address to the synchronization determining unit 15, and then determines from an output result from the synchronization determining unit 15 whether or not the transmission destination address is synchronized. In addition, the communication control unit 17 extracts the common PIB 16a and the CSL mode PIB 16c from the control information storage unit 16. The communication control unit 17 refers to a BE in the CSMA/CA or the initial value macMinBEcs1 of backoff time and sets the initial value (BE) of the backoff time at 0. The other values to be set are the same as those of the conventional CSMA/CA, so the description will be omitted.

The communication control unit 17 then executes the following CSMA/CA process.

First, the communication control unit 17 performs carrier sensing after a backoff period of time as much as a random ($2^{BE}-1$) has passed. Since the BE is 0, the communication control unit 17 senses a carrier soon at the first try.

If a corresponding CH is in an idle state, the communication control unit 17 proceeds to the next process as the CSMA/CA. If a corresponding CH is in the idle state, the communication control unit 17 adds one to the value of the BE, decides the backoff time, and then stands by for the backoff time. The communication control unit 17 then examines whether or not the corresponding CH is in the idle state. The communication control unit 17 performs the series of processes until it is sensed that the corresponding CH is in the idle state or until the maximum number of backoff is reached and it is determined that the CSMA/CA results in failure.

The initial value of backoff time is set as a fixed value in this embodiment, but may also be set as a variable value. For example, if no ACKs are successively received, the initial value of backoff time may be set at 0.

If it is determined that the CSMA/CA process executed by the communication control unit 17 results in success, the wireless transmission unit 12 transmits a wakeup frame (S103). To the contrary, if it is determined that this process results in failure, the wireless transmission unit 12 does not transmit any wakeup frame.

The communication control unit 17 determines whether or not the transmission of wakeup frames is all completed (S104). If the number of transmission set in advance has been reached or the transmission time set in advance has been exceeded, the communication control unit 17 determines that the transmission is completed and executes the process in step S105 discussed below. If the transmission of wakeup frames is not all completed, the communication control unit 17 re-executes the process in step S102 discussed above. The BE is reset at 0 and carrier sensing is performed in the re-executed process in step S102 (i.e. the initial value of the backoff time is 0), so that the transmission intervals of wakeup frames are facilitated to be the shortest.

Once the transmission of wakeup frames is completed, the wireless transmission unit 12 subsequently transmits a data frame (S105). Setting the BE at 0 here facilitates the data frame to be transmitted to the wireless communication device 1 at the time designated by the rendezvous time RZTime in the wakeup frame. There is a low probability that although a wireless communication device (reception side) receives a wakeup frame, a reception error occurs with respect to a data frame.

After transmitting a data frame, the communication control unit 17 stays in an ACK listening state for a predetermined time (S106). If the communication control unit 17 receives an ACK, the communication control unit 17 imports information in the ACK.

If an ACK is received, the synchronization determining unit 15 updates the content of the synchronization information storage section 15a (S107). If there is no corresponding transmission destination address, the synchronization determining unit 15 newly adds the corresponding transmission destination address to the synchronization information storage section 15a. If ACK listening times out, the synchronization determining unit 15 discards the content of the synchronization information storage section 15a. The synchronization determining unit 15 does not necessarily have to discard the content immediately when ACK listening results in failure one time, but the synchronization determining unit 15 may be configured to discard the content of the synchronization information storage section 15a, for example, when ACK listening successively results in failure N times.

If the mode other than the CSL mode (i.e. normal mode) is set in the process in step S101 discussed above, the communication control unit 17 extracts the normal mode PIB 16b from the control information storage unit 16, refers to the macMinBEnormal, and sets the initial value (BE) of backoff time at 3 (S108). The other processes are the same as the process in step S102, so that the description will be omitted.

Next, the communication control unit 17 performs carrier confirmation in the CSMA/CA (S109). The backoff time is obtained by multiplying 0 to 7 by aUnitBackoffPeriod, which results in a higher probability that the backoff time is longer than that of communication in the CSL mode.

The communication control unit 17 may set the maximum number of backoff (macMaxCSMABackoff) at 3 in both of the CSL mode and the normal mode, and may set the initial value of backoff time at 0 in the normal mode. In addition, backoff time may also be set, for example, as shown in the following expression. (random $(2^{BE}-1)+3$)×aUnitBackoffPeriod That is to say, the backoff time has a value from 0 to 2 in the CSL mode, while the backoff time has a value from 3 to 5 in the normal mode. The CSL mode inevitably leads to shorter backoff time than the normal mode in this method.

If a determination in the CSMA/CA results in success, the wireless transmission unit 12 transmits a frame in the normal mode (S109). To the contrary, if a determination in the CSMA/CA results in failure, the wireless transmission unit 12 does not transmit any frame. The wireless transmission unit 12, for example, notifies the communication control unit 17 of a transmission error and completes the transmission process.

Figure 3:
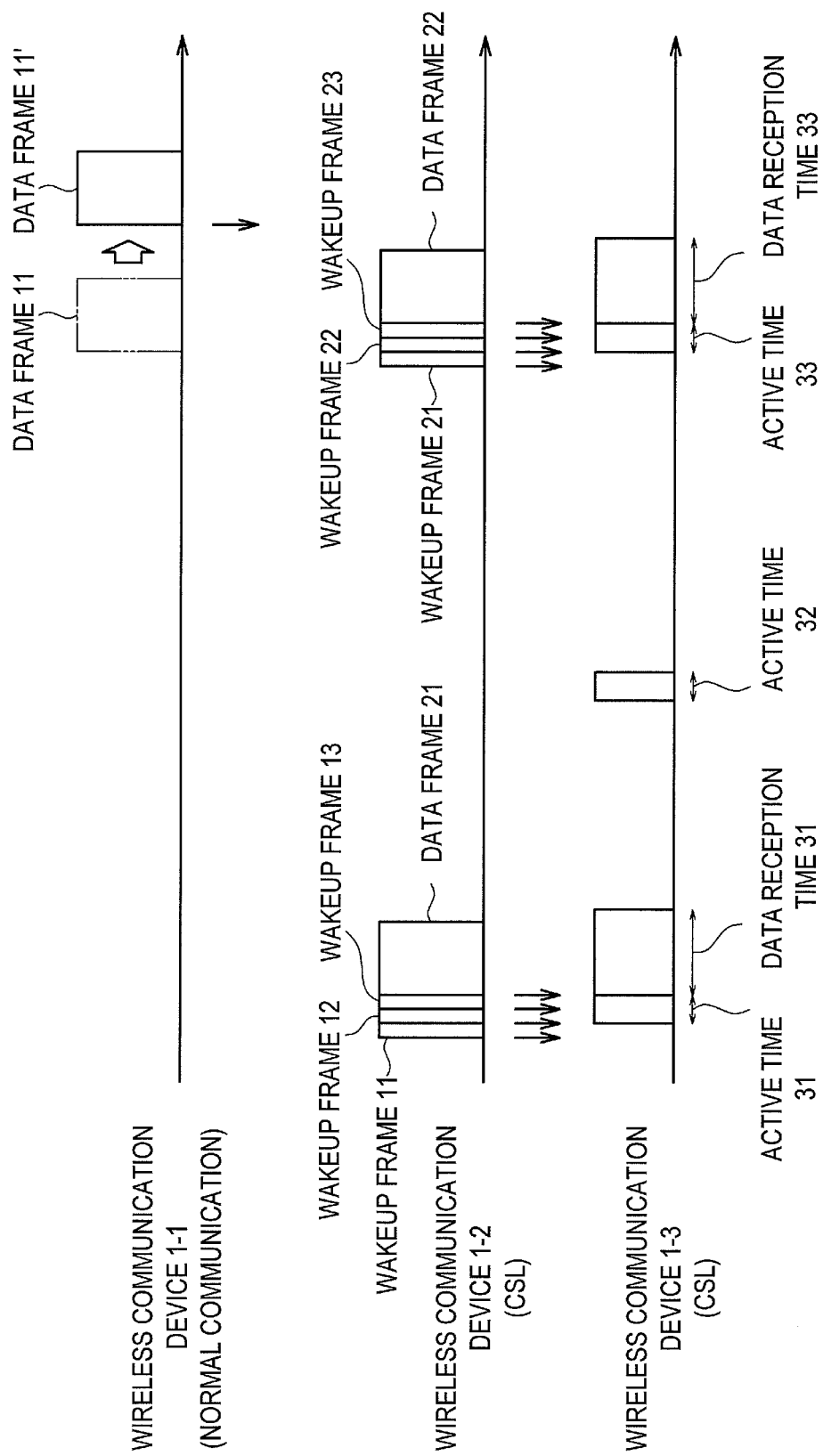
FIG. 3 is an explanatory diagram illustrating an operation for two wireless communication devices (transmission side) according to the first embodiment.

FIG. 3 is an explanatory diagram illustrating an operation for two wireless communication devices (transmission side) according to the first embodiment.

Let us assume that a wireless communication device 1-2 is performing CSL synchronous communication with a wireless communication device 1-3. It is also assumed that a wireless communication device 1-1 is transmitting data to a wireless communication device other than the wireless communication device 1-2 and the wireless communication device 1-3 in the normal mode.

The wireless communication device 1-2 attempts to transmit the wakeup frame 22, while the wireless communication device 1-1 attempts to transmit the data frame 11 at the same time.

The initial value of the BE is 0 in the CSL mode, and the initial value of the BE is 3 in the normal mode. Accordingly, the wakeup frame 22 easily leads to shorter backoff time. That is to say, the wakeup frame 22 is facilitated to be transmitted earlier than the data frame 11.

Next, if the wireless communication device 1-1 attempts to transmit the data frame 11 after backoff delay, but senses that a corresponding CH is not in the idle state, the wireless communication device 1-1 further adds one to the BE, calculates the backoff time, and is delayed. The wireless communication device 1-2 sets the BE or the backoff time at 0 to perform a transmission process for the wakeup frame 23 after transmitting the wakeup frame 22, which results in very short time from the completion of the frame transmission to the start of the next frame transmission. That is to say, there is a high probability that the wireless communication device 1-1 does not reach the idle state even in the second CCA. Consequently, the wakeup frame 23 is facilitated to be transmitted earlier than the data frame 11.

The data frame 22 is facilitated to be transmitted earlier than the data frame 11, which the wireless communication device 1-1 attempts to transmit. Furthermore, the wakeup frame 21, the wakeup frame 22, the wakeup frame 23, and the data frame 22 are facilitated to be successively transmitted at the shortest intervals. As a result, the data frame 11, which the wireless communication device 1-1 attempts to transmit, is transmitted as a data frame 11' after the transmission of the data frame 22 from the wireless communication device 1-2.

As described above, wakeup frames are facilitated to be transmitted at the shortest intervals, so that the wireless communication device 1-2 transmits a wakeup frame at the synchronously corrected time with the wireless communication device 1-3.

FIG. 4 is an explanatory diagram illustrating an intermittent reception operation of a wireless communication device (reception side) according to the first embodiment.

Figure 4A:
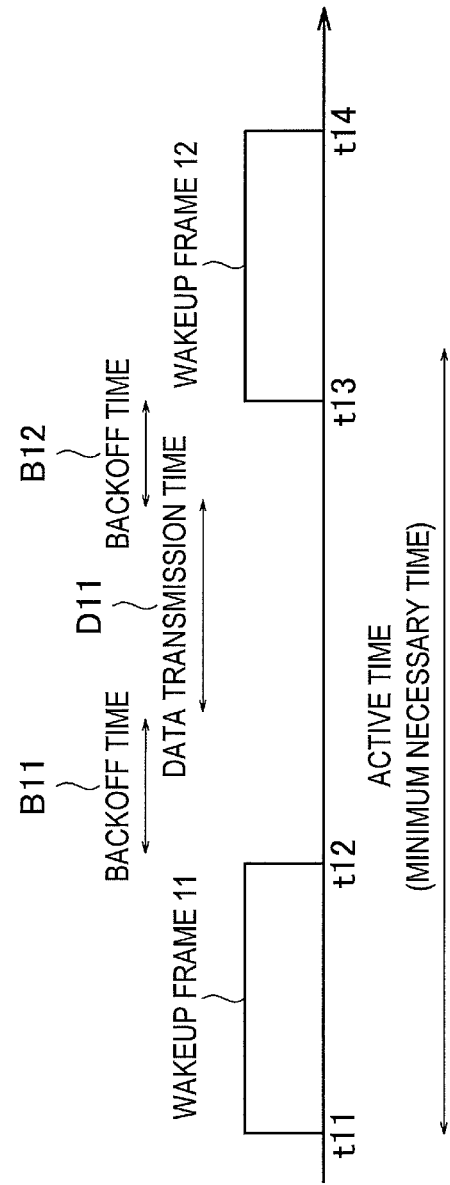
FIG. 4A is an explanatory diagram illustrating an intermittent reception operation of a wireless communication device (reception side) according to the first embodiment.

FIG. 4A illustrates an intermittent operation of a conventional wireless communication device. The wireless communication device has to back off after transmitting the wakeup frame 11 and before transmitting the wakeup frame 22. Even though the wireless communication device performs CCA after backoff time B11, the wireless communication device fails to transmit the wakeup frame 22 because another wireless communication device is transmitting data (data transmission time D11). Consequently, the wireless communication device has to back off again, but the transmission of the wakeup frame 22 is possibly suspended for a time obtained by adding the data transmission time D11 to backoff time B12, depending on timing.

Figure 4B:
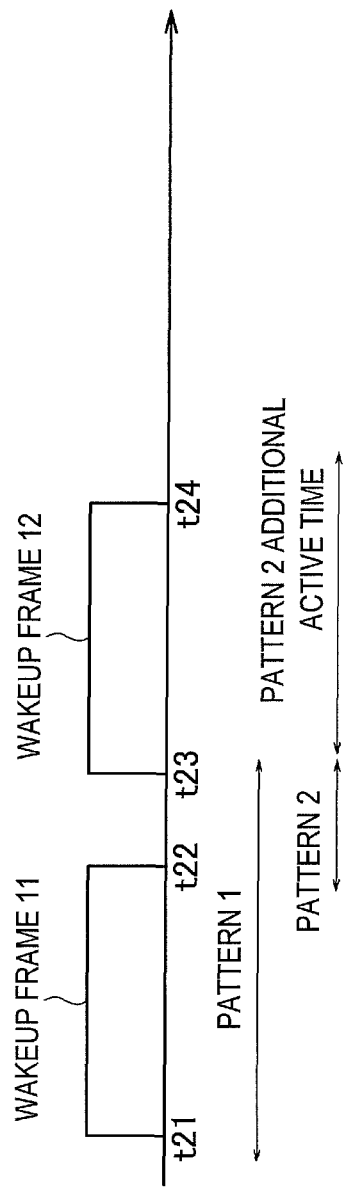
FIG. 4B is an explanatory diagram illustrating an intermittent reception operation of a wireless communication device (reception side) according to the first embodiment.

FIG. 4B is an explanatory diagram illustrating an intermittent reception operation of a wireless communication device in a case where a wireless communication device according to the first embodiment is introduced.

If the wireless communication device 1 according to the first embodiment is introduced, transmission in the CSL mode is prioritized. Accordingly, an interval between the wakeup frame 11 and the wakeup frame 21 becomes shorter than that of FIG. 4A. In other words, there is a high probability of reception even without considering the interruption of another wireless device, so that the wireless communication device 1 can have active time remarkably shortened. Operating the wireless communication device 1 only for necessary time for which the two of the wakeup frame 11 and the wakeup frame 21 are transmitted at the shortest intervals (pattern 1 in FIG. 4B) facilitates wakeup frames to be received. There is a high probability of reception even without considering the interruption of transmission of another wireless communication device as illustrated in FIG. 4A, which illustrates a conventional intermittent operation, so that the wireless communication device 1 can have active time remarkably shortened.

There is a high probability that the active time of the wireless communication device 1 from the transmission end time of the wakeup frame 11 to the transmission time of the next wakeup frame 21 (from t11 to t12) is remarkably shorter than the active time of the wireless communication device 1 until the transmission time of the wakeup frame 11 (from t11 to t12). Accordingly, the use of the method illustrated in FIG. 5 allows the active time to be further shortened.

Figure 5:
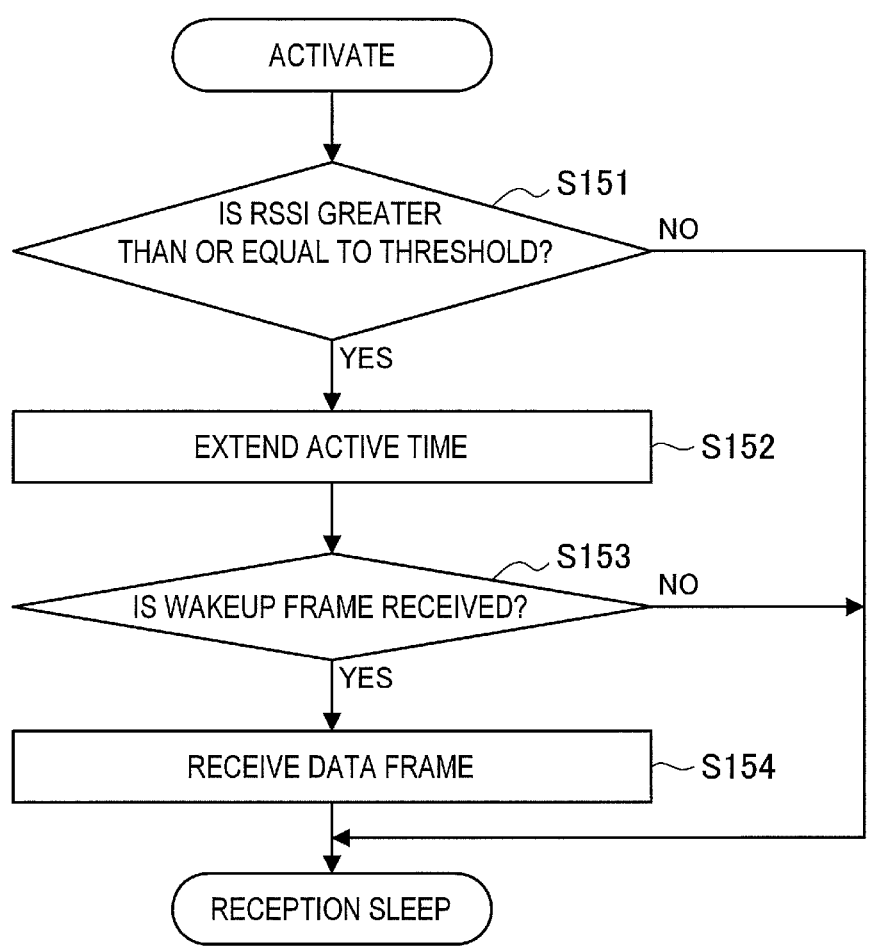
FIG. 5 is a flowchart illustrating an operation of a wireless communication device (reception side) according to the first embodiment.

FIG. 5 is a flowchart illustrating an operation of a wireless communication device (reception side) according to the first embodiment.

The wireless communication device 1 is activated, and then measures a received signal strength indicator (RSSI) (S151).

If the RSSI is greater than or equal to a threshold, the wireless communication device 1 executes the process in step S152 discussed below. If the RSSI is less than the threshold, the wireless communication device 1 reaches a reception sleep state again.

If the RSSI is greater than or equal to the threshold, the wireless communication device 1 extends the active time to receive a wakeup frame, and transitions to the listening state (S152).

If the wireless communication device 1 receives a wakeup frame addressed to the wireless communication device 1, the wireless communication device 1 executes the process in step S154 discussed below. If the wireless communication device 1 does not receive any wakeup frame addressed to the wireless communication device 1, the wireless communication device reaches the reception sleep state again (S153).

The wireless communication device 1 refers to the rendezvous time RZTime in the wakeup frame, decides the active time, and receives a data frame (S154). The wireless communication device 1 replies an ACK if the wireless communication device 1 receives a data frame. After transmitting an ACK, the wireless communication device 1 reaches the reception sleep state again.

Even if the active time of the wireless communication device 1 is set as time (pattern 2) obtained by adding margin time to time from t22 to t23, this method allows for reception. The margin time here is time necessary until the RSSI exceeds the threshold after t23.

(A-3) Advantageous Effects of First Embodiment

Minimizing the initial value of backoff time in the CSMA/CA for synchronous communication such as the CSL allows a wireless communication device to shorten transmission intervals of wakeup frames. That is to say, wirelessly transmitting wakeup frames for synchronous communication with priority over other frames decreases a probability that the intervals of wakeup frames increase. There is a low probability that the wireless communication device transmits a wakeup frame later than the synchronously corrected timing.

Even if the active time of a wireless communication device on the reception side is shortened, a wireless communication device can maintain as high a reception probability as that of a wireless communication device that is operating for a long time. Accordingly, it is possible to save power.

Furthermore, there is a low probability that an asynchronous mode is applied, so that it is possible to decrease the number of transmission of wakeup frames, bringing about an advantageous effect of reducing a load on a network.

(B) Second Embodiment

Next, a wireless transmission device, a wireless reception device, a wireless transmission program, a wireless reception program, and a wireless communication system according to a second embodiment of the present invention will be described below with reference to the appended drawings.

(B-2) Configuration According to Second Embodiment

Figure 6:
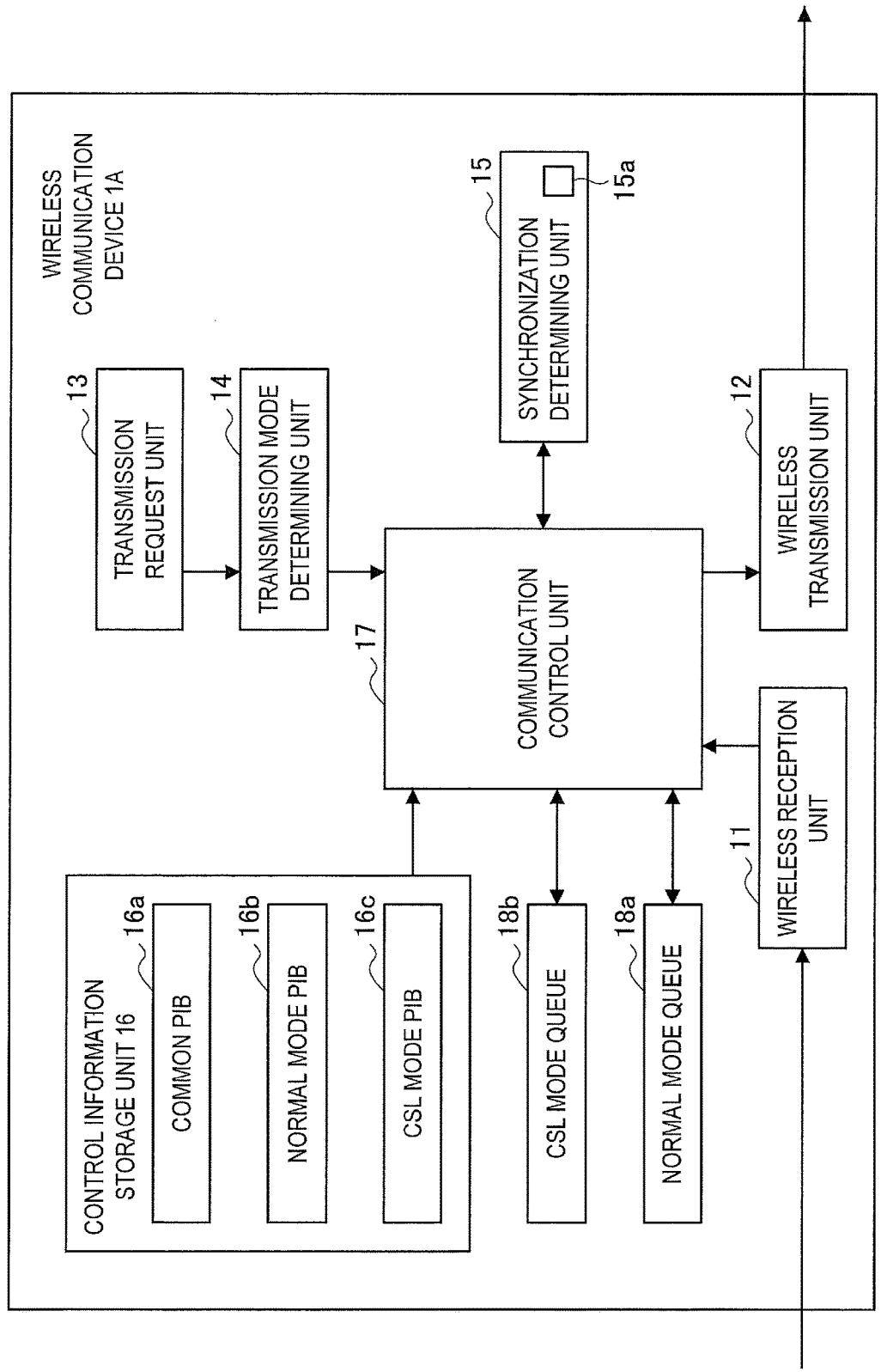
FIG. 6 is a block diagram illustrating a configuration of a wireless communication device according to a second embodiment.

FIG. 6 is a block diagram illustrating the configuration of the wireless communication device according to the second embodiment, which serves as a wireless transmission device or a wireless reception device. The same units as the units according to the first embodiment in FIG. 1 or the units corresponding to the units according to the first embodiment in FIG. 1 are denoted with the same or corresponding reference numerals.

FIG. 6 illustrates that a wireless communication device 1A includes a normal mode queue 18a and a CSL mode queue 18b in addition to the wireless reception unit 11, the wireless transmission unit 12, the transmission request unit 13, the transmission mode determining unit 14, the synchronization determining unit 15, the control information storage unit 16, and the communication control unit 17.

The configuration of the wireless communication device according to the second embodiment is obtained by adding the normal mode queue 18a and the CSL mode queue 18b to the configuration of the wireless communication device according to the first embodiment.

Although the wireless communication device according to the first embodiment also includes a frame transmission waiting queue which is not illustrated, the wireless communication device according to the second embodiment is characterized in that the frame transmission waiting queue is divided into the CSL mode queue and the normal mode queue.

The normal mode queue 18a suspends frame transmission in the normal mode until transmission time decided by the communication control unit 17. The CSL mode queue 18b suspends frame transmission in the CSL mode until transmission time decided by the communication control unit 17.

The other points are the same as in the configuration of the wireless communication device according to the first embodiment, so that the description will be omitted.

(B-2) Operation According to Second Embodiment

Next, a transmission related operation of the wireless communication device 1A according to the second embodiment, which is configured as described above, will be described with reference to the appended drawings.

Figure 7:
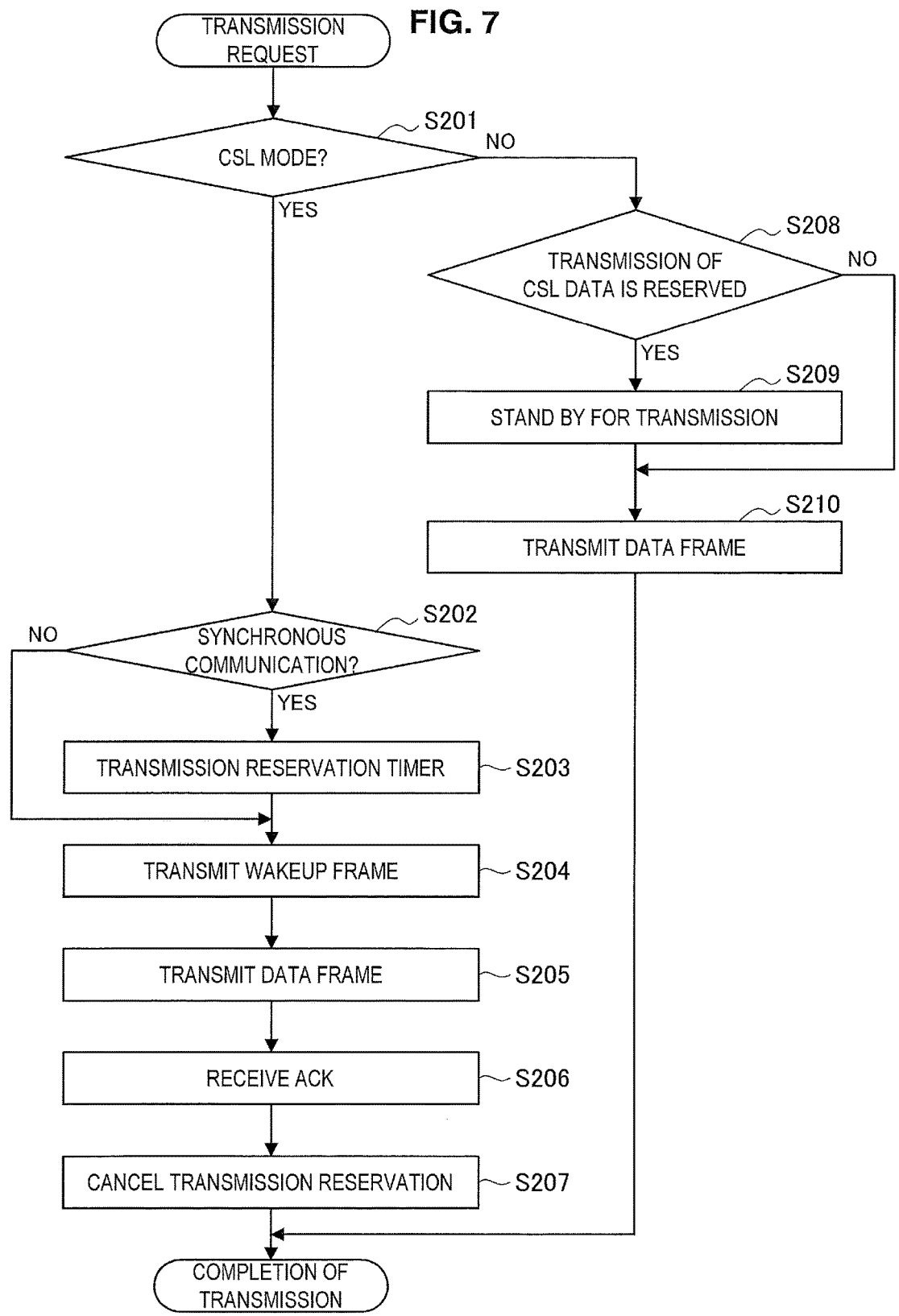
FIG. 7 is a flowchart illustrating an operation of a wireless communication device (transmission side) according to the second embodiment.

FIG. 7 is a flowchart illustrating an operation of a wireless communication device (transmission side) according to the second embodiment.

The communication control unit 17 determines whether or not the CSL mode is used (S201).

The communication control unit 17 executes the process in step S202 discussed below if the CSL mode is used, while the communication control unit 17 executes the process in step S208 discussed below if the normal mode is used.

If the CSL mode is used, the communication control unit 17 refers to a transmission destination address, and determines whether or not synchronous communication is performed (S202). The communication control unit 17 executes the process in step S203 discussed below if synchronous communication is performed, while the communication control unit 17 executes the process in step S204 discussed below if asynchronous communication is performed.

If synchronization is done, the communication control unit 17 sets a transmission reservation timer and stores transmission data in the CSL mode queue 18b (S203). A timer starts from just before the transmission time of a wakeup frame to the transmission completion estimated time of a data frame. The communication control unit 17 then stands by until the transmission time.

The wireless transmission unit 12 transmits a wakeup frame (S204). The details are the same as the processes in steps S102 to S104 in FIG. 2, so that the description will be omitted.

The wireless transmission unit 12 transmits a data frame (S205). The details are the same as the process in step S105 in FIG. 2, so that the description will be omitted.

The communication control unit 17 transitions to the ACK listening state (S206). The details are the same as the processes in steps S106 to S107 in FIG. 2, so that the description will be omitted.

If the transmission reservation timer set in S203 is in operation, the communication control unit 17 cancels the timer (S207).

If the normal mode is used, the communication control unit 17 examines whether or not the transmission reservation timer set in step S203 discussed above in the CSL mode communication is in operation (S208). If the transmission reservation timer is in operation, the communication control unit 17 executes the process in step S209 discussed below. If the transmission reservation timer is not in operation, the communication control unit 17 executes the process in step S210 discussed below.

The communication control unit 17 stands by for transmission until the transmission reservation is canceled (S209).

If the transmission timing comes, the wireless transmission unit 12 executes a transmission process (S210).

Figure 8:
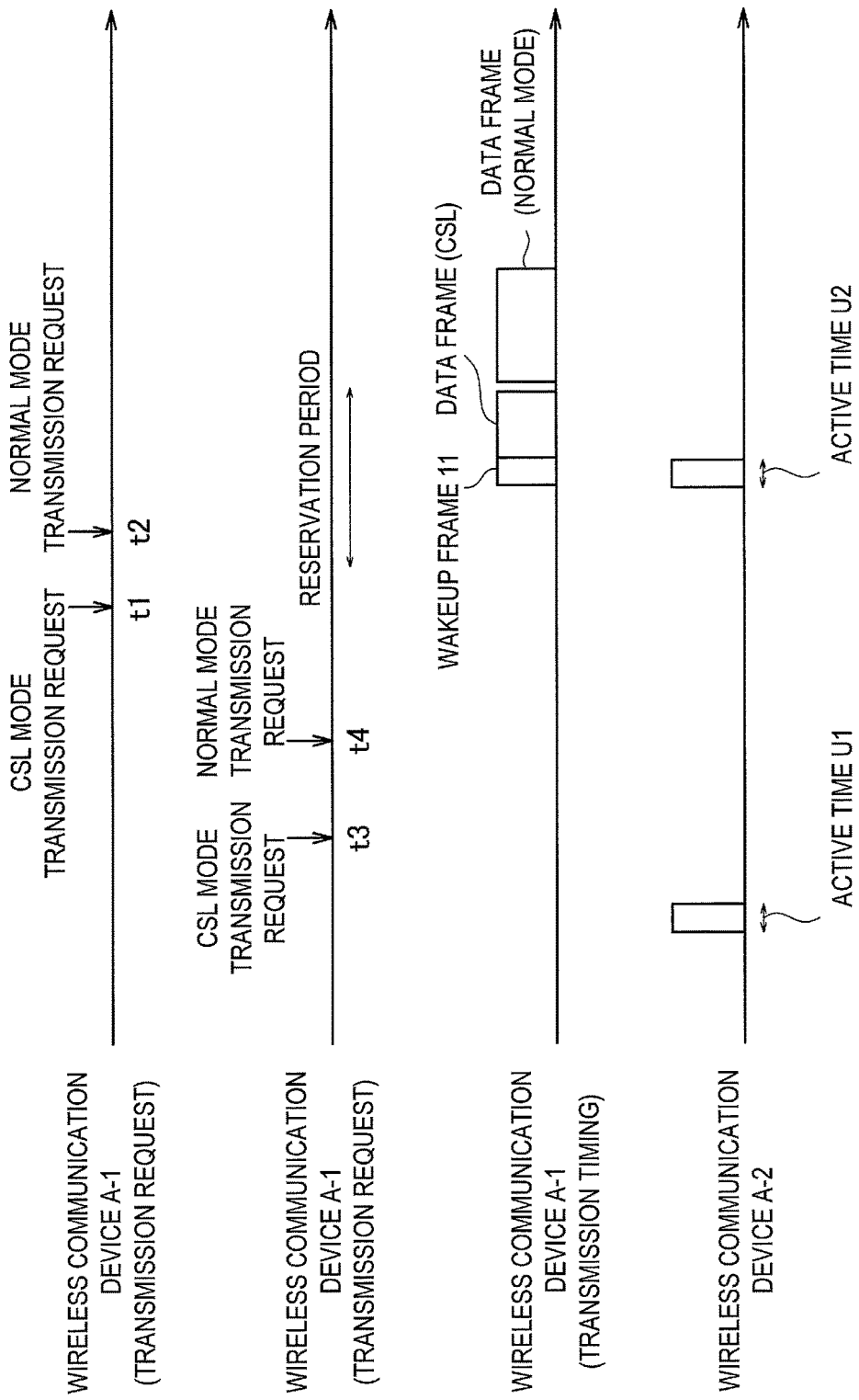
FIG. 8 is an explanatory diagram illustrating an operation for a wireless communication device (transmission side) according to the second embodiment to successively transmit data in a CSL mode and a normal mode.

FIG. 8 is an explanatory diagram illustrating an operation for a wireless communication device according to the second embodiment to successively transmit data in the CSL mode and the normal mode.

A wireless communication device A-1 makes a transmission reservation before or after time at which the wireless communication device A-1 is synchronized with a wireless communication device A-2 next time, if there is a transmission request in the CSL mode at time t1.

If there is transmission in the normal mode at time t2, the wireless communication device A-1 stands by until data transmission in the CSL mode is completed because the transmission at the time t2 is within the reservation period. This allows the wireless communication device A-1 to decrease a probability that transmission in the normal mode is performed at time at which wakeup transmission is to be performed.

If there is a transmission request in the normal mode at time t4, the wireless communication device A-1 transmits data in the normal mode prior to transmission in the CSL mode because the transmission at time t4 is out of the reservation period. This is because there is a low probability that the transmission in the normal mode started by the wireless communication device A-1 immediately after the time t4 drags on until time at which the wakeup frame 11 is to be transmitted.

(B-3) Advantageous Effects of Second Embodiment

A wireless communication device prioritizes transmission in the CSL mode over transmission in the normal mode, thereby reducing a probability that the transmission time of a wakeup frame shifts. Accordingly, it becomes possible for a wireless communication device on the reception side to efficiently receive the wakeup frame.

(C) Other Embodiments

In addition to the embodiments described above, modified examples below are also possible.

(C-1) It is described in the above-described embodiments that a wireless communication device is a device that can perform communication by switching both of the CSL mode and the normal mode, but a wireless communication device may also perform communication in the CSL mode alone or the normal mode alone. If there are at least two wireless communication devices that perform communication in the CSL mode in a wireless network, the advantageous effects of the present invention can be attained.

(C-2) It is described in the above-described embodiments that the CSL mode is always prioritized, but asynchronous communication may be performed in the normal mode and the CSL mode may be prioritized only for synchronous communication.

Figure 9:
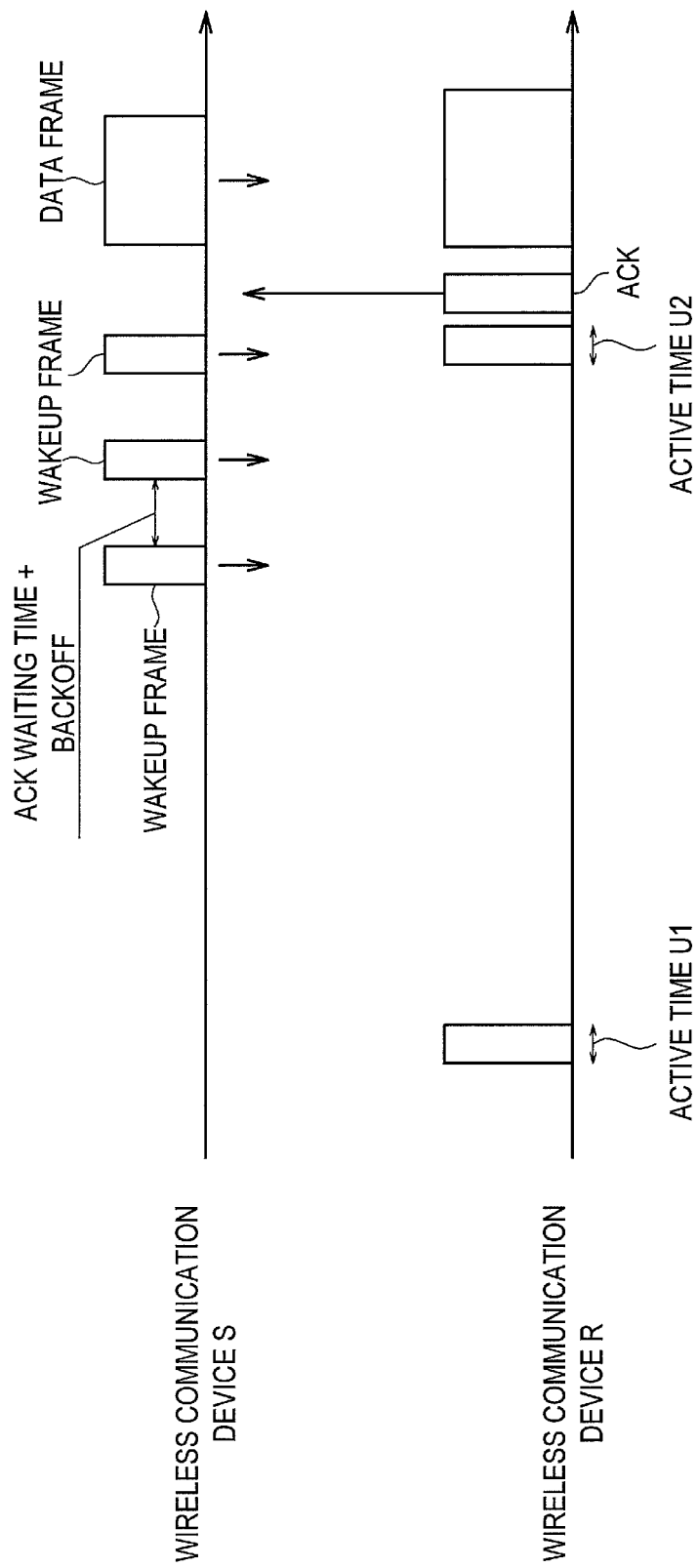
FIG. 9 is an explanatory diagram illustrating a wireless communication device that operates in accordance with X-MAC.

(C-3) A scheme of synchronous communication is described in the above-described embodiments with the CSL alone as an example, but this is also applicable to another scheme of synchronous communication, for example, for replying a synchronization frame (ACK) other than data frame transmission. For example, this is also applicable to a scheme of synchronous communication in which a predetermined number of transmission is not performed or transmission is not performed for a predetermined time for the transmission of a wakeup frame, but an ACK is replied from a wireless communication device that is a transmission destination as illustrated in FIG. 9. FIG. 9 is an explanatory diagram illustrating a wireless communication device that operates in accordance with short preamble MAC protocol for duty-cycled wireless sensor networks (X-MAC), which is an example of those schemes of synchronous communication.

Figure 10:
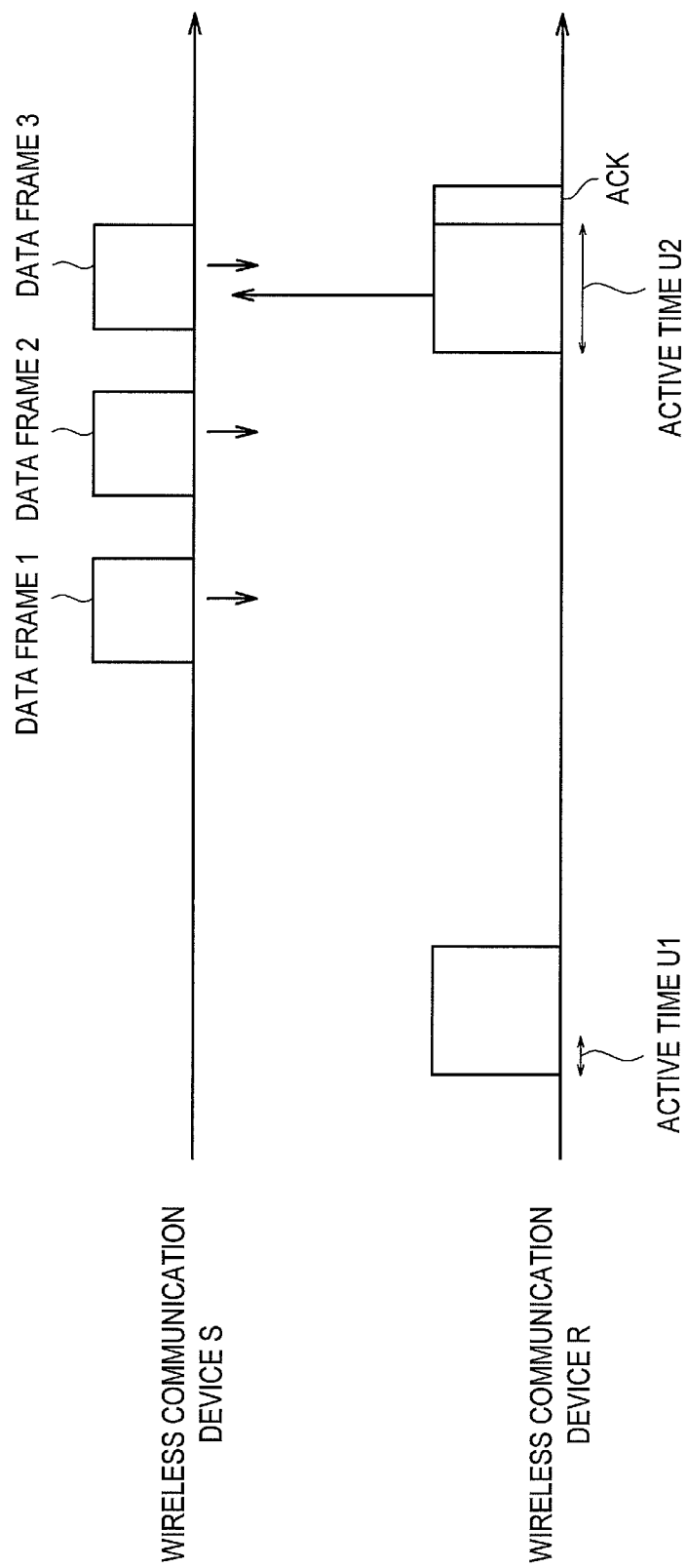
FIG. 10 is an explanatory diagram illustrating a wireless communication device that operates in accordance with BoX-MACs.
Figure 11:
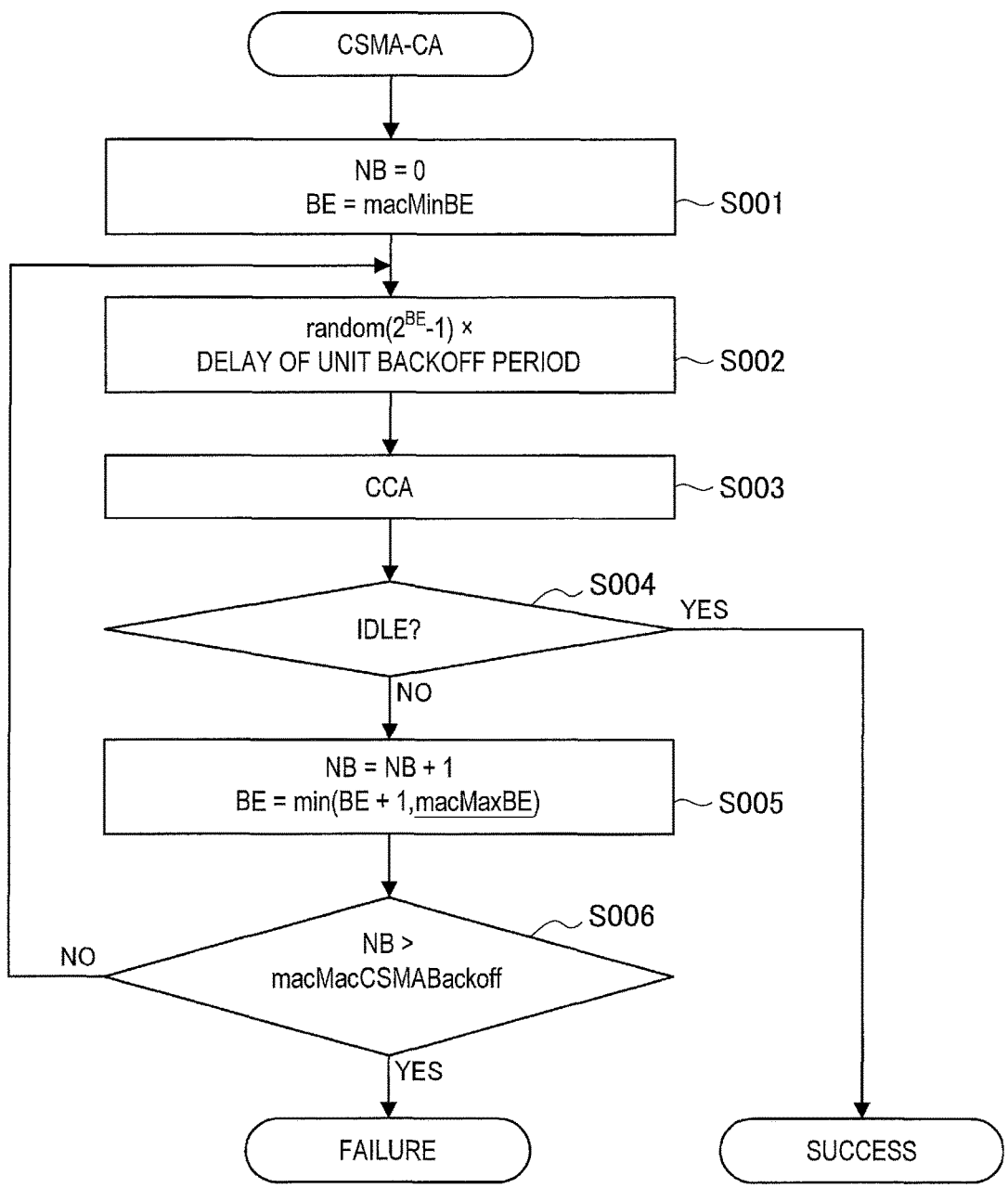
FIG. 11 is a flowchart illustrating a CSMA/CA algorithm.
Figure 12:
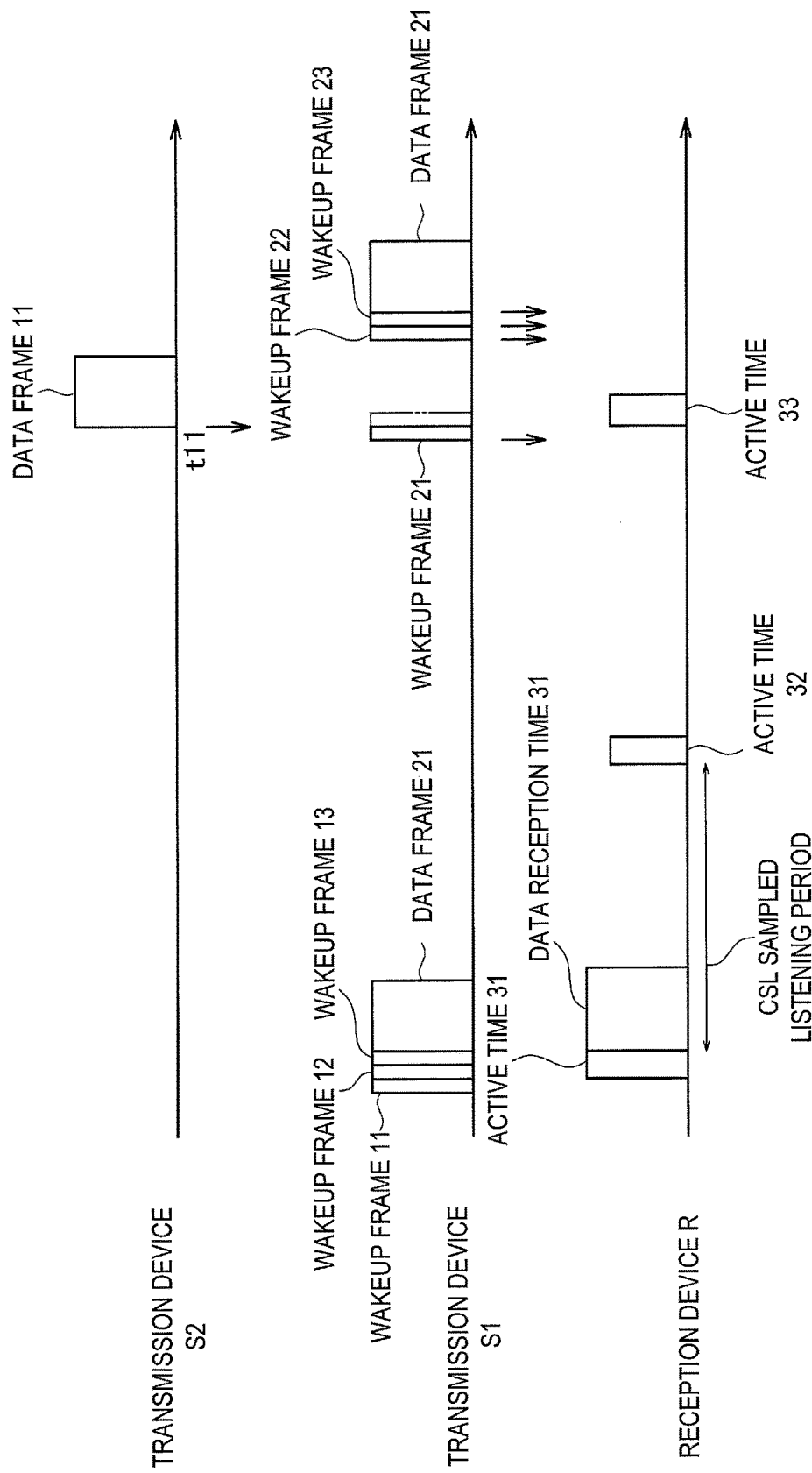
FIG. 12 is an explanatory diagram illustrating that a plurality of transmission devices according to conventional technology make transmission requests at the same time.

It is also applicable to a scheme of synchronous communication in which a data frame also serves as a wakeup frame, data frames are successively transmitted as illustrated in FIG. 10, and an ACK is replied from a wireless communication device that is a transmission destination. FIG. 10 is an explanatory diagram illustrating a wireless communication device that operates in accordance with exploiting physical and link layer boundaries in low-power networking (BoX-MACs), which is an example of those schemes of synchronous communication.

Note that the wireless communication method of the embodiments described above can be configured by software. In the case of configuring by software, the program that implements at least part of the sound collection and reproduction method may be stored in a non-transitory computer readable medium, such as a flexible disk or a CD-ROM, and may be loaded onto a computer and executed. The recording medium is not limited to a removable recording medium such as a magnetic disk or an optical disk, and may be a fixed recording medium such as a hard disk apparatus or a memory. In addition, the program that implements at least part of the a wireless communication method may be distributed through a communication line (also including wireless communication) such as the Internet. Furthermore, the program may be encrypted or modulated or compressed, and the resulting program may be distributed through a wired or wireless line such as the Internet, or may be stored a non-transitory computer readable medium and distributed.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A wireless transmission device comprising:
   a processor; and
   a non-transitory medium containing program instructions, execution of which by the processor causes the wireless transmission device to provide functions of:
      a frame transmitting unit configured to transmit a frame when a frame transmission request is made by an upper layer processing unit, and
      a frame group transmitting unit configured to transmit a frame group including one or two or more types of frame in accordance with a listening state of a facing wireless reception device when the frame transmission request is made by the upper layer processing unit, wherein
      first random delay is inserted before the frame transmitting unit transmits the frame, in response to the frame transmission request made by the upper layer processing unit,
      second random delay is inserted before frame transmission of a second or following frame in the frame group before the frame group transmitting unit transmits the frame group, and is different from the first random delay, and
      the second random delay is shorter than the first random delay.

2. The wireless transmission device according to claim 1, wherein the second random delay is obtained by adding a maximum waiting time of a reception response frame from the facing wireless reception device to minimum delay within the first random delay.

3. The wireless transmission device according to claim 1, wherein a frame that the frame group transmitting unit transmits includes a frame which notifies the facing wireless reception device in advance that a data frame is to be transmitted.

4. The wireless transmission device according to claim 1, wherein the frame group transmitting unit transmits, as one type of frame, a data frame and a frame which notifies the facing wireless reception device in advance that a data frame is to be transmitted.

5. The wireless transmission device according to claim 1, further comprising:
a transmission reservation timer setting unit configured to set a transmission reservation timer of predetermined time before the frame group transmitting unit transmits the frame group, wherein, when the transmission reservation timer is set before the frame transmitting unit transmits the frame, the frame transmitting unit transmits the frame under condition that the transmission reservation timer is canceled.

6. A wireless communication system, comprising:
at least one wireless transmission device; and
at least one wireless reception device, each of which stays in a listening state over active time that intermittently occurs in each listening period, receives a frame group including one or two or more types of frame, and replies a reception response frame upon receiving a predetermined frame,
wherein each of the at least one wireless transmission device includes
a first processor, and
a first non-transitory medium containing program instructions, execution of which by the first processor causes said each wireless transmission device to provide functions of:
a frame transmitting unit configured to transmit a frame when a frame transmission request is made by an upper layer processing unit, and
a frame group transmitting unit configured to transmit a frame group including one or two or more types of frame in accordance with a listening state of a facing wireless reception device when the frame transmission request is made by the upper layer processing unit, wherein
first random delay is inserted before the frame transmitting unit transmits the frame, in response to the frame transmission request made by the upper layer processing unit,
second random delay is inserted before frame transmission of a second or following frame in the frame group before the frame group transmitting unit transmits the frame group, and is different from the first random delay, the second random delay being shorter than the first random delay; and
wherein each of the at least one wireless reception device includes
a second processor, and
a second non-transitory medium containing program instructions, execution of which by the second processor causes said each wireless reception device to provide functions of
a frame group reception estimating unit configured to measure reception signal strength successively for a predetermined period, and to determine that a frame group is being transmitted around said each wireless reception device, when the reception signal strength is greater than or equal to a predetermined value.

\* \* \* \* \*